(12) United States Patent
Boscher et al.

(10) Patent No.: US 9,524,144 B2
(45) Date of Patent: Dec. 20, 2016

(54) DATA PROCESSING METHOD AND RELATED DEVICE

(75) Inventors: Arnaud Boscher, Puteaux (FR); Robert Naciri, Chatenay Malabry (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 2831 days.

(21) Appl. No.: 11/793,673

(22) PCT Filed: Dec. 16, 2005

(86) PCT No.: PCT/FR2005/003170
§ 371 (c)(1),
(2), (4) Date: Aug. 9, 2007

(87) PCT Pub. No.: WO2006/070092
PCT Pub. Date: Jul. 6, 2006

(65) Prior Publication Data
US 2008/0130870 A1    Jun. 5, 2008

(30) Foreign Application Priority Data
Dec. 23, 2004    (FR) ...................................... 04 13839

(51) Int. Cl.
*G06F 21/00* (2013.01)
*G06F 7/72* (2006.01)

(52) U.S. Cl.
CPC ................. *G06F 7/72* (2013.01); *G06F 7/728* (2013.01)

(58) Field of Classification Search
USPC ........................................................ 380/277
See application file for complete search history.

(56) References Cited

U.S. PATENT DOCUMENTS

| 5,987,131 | A | * | 11/1999 | Clapp | ..................... H04L 9/321 380/283 |
| 6,088,453 | A | * | 7/2000 | Shimbo | ................... G06F 7/721 380/28 |
| 6,405,923 | B1 | | 6/2002 | Seysen | |
| 6,466,668 | B1 | * | 10/2002 | Miyazaki | ............... G06F 7/728 380/30 |

(Continued)

FOREIGN PATENT DOCUMENTS

| EP | 0578059 | 1/1994 |
| EP | 0 704 794 A | 4/1996 |

(Continued)

OTHER PUBLICATIONS

EP1650727.*

(Continued)

*Primary Examiner* — Harris C Wang
(74) *Attorney, Agent, or Firm* — Young & Thompson

(57) ABSTRACT

Data processing method and related devices for determining the result of a first type of operation involving an operand in an electronic entity comprising a non-volatile storage unit, includes the following steps: converting a data, derived from at least one key portion designed to be used with the operand in the first type of operation, into a key data adapted to be used with the operand in a second type of operation; storing the key data in the non-volatile storage unit; reading in the non-volatile storage unit the key data; performing the second type of operation with the read key data and the operand.

14 Claims, 3 Drawing Sheets

(56) References Cited

U.S. PATENT DOCUMENTS

| | | | |
|---|---|---|---|
| 6,546,104 B1* | 4/2003 | Shimbo | G06F 7/728 380/28 |
| 7,380,125 B2* | 5/2008 | Di Luoffo et al. | 713/168 |
| 7,680,272 B2* | 3/2010 | Yoon et al. | 380/30 |
| 2002/0101984 A1* | 8/2002 | Asami | G06F 7/728 380/28 |
| 2004/0228478 A1 | 11/2004 | Joye | |
| 2005/0041811 A1* | 2/2005 | Kobayashi | G06F 7/728 380/255 |
| 2006/0112273 A1* | 5/2006 | Tuyls | H04L 9/321 713/171 |
| 2006/0126830 A1* | 6/2006 | Shimizu | G06F 7/728 380/28 |
| 2006/0231632 A1 | 10/2006 | Jayet et al. | |

FOREIGN PATENT DOCUMENTS

| | | |
|---|---|---|
| EP | 0 933 695 A | 8/1999 |
| FR | 2824210 | 10/2002 |
| WO | 98/19231 A | 5/1998 |
| WO | WO 2004/054168 | 6/2004 |
| WO | WO 2004/063999 | 7/2004 |
| WO | WO 2004/093019 | 10/2004 |
| WO | WO 2006/030107 | 3/2006 |

OTHER PUBLICATIONS

Handbook of Applied Cryptography by A. Menezes et al. pp. 447-454.
Article about GQ2, by Boutiton et al.

\* cited by examiner

DATA PROCESSING METHOD AND RELATED DEVICE

The invention concerns methods of processing data, for example for the implementation of cryptographic algorithms, and devices adapted to execute such methods.

Data processing methods routinely implemented in electronic entities such as microcircuit cards and microcomputers employ operations that are sometimes complex. In the cryptography field, for example, numerous algorithms use modular arithmetic, especially modular multiplication (which associates with two numbers a and b the remainder of their product modulo a particular number called the modulus n) or the modular exponentiation operation (which associates with two numbers a and e the remainder modulo n of the number $a^e$).

The calculation cost of such operations can prove high if the calculations are effected in the conventional manner, for example because of the use of large numbers in cryptographic algorithms to obtain a correct level of security.

Because of this it has been proposed to optimize the calculations to be effected by defining new operations that lighten the calculations carried out within the algorithms and are in practice effected by dedicated electronic circuits.

This is the background to the introduction of Montgomery arithmetic, the basic operations of which are as follows:

Montgomery multiplication, represented by the symbol "*", is defined as follows:

$$a*b \bmod n = a \cdot b \cdot r^{-1} \bmod n,$$

in which r is the Montgomery radix (an integer prime with n and greater than n) and the symbol "·" represents conventional multiplication (generally called "Euclidean multiplication" in this context);

Montgomery exponentiation, represented by preceding the exponent with the symbol "*" and defined as follows:

$$a^{*e} \bmod n = a^e \cdot r^{1-e} \bmod n.$$

The advantage obtained by the use of Montgomery arithmetic is primarily that the algorithms do not then need to effect the conventional reduction modulo n, which involves an operation of division by a large number, which is particularly complex to execute.

The use of this arithmetic necessitates certain additional calculations, however, which can in some cases reduce its benefit, sometimes to the point where it is preferable to carry out an operation in the standard manner. For example, noting that:

$$a \cdot b \bmod n = (a*r^2)*b \bmod n,$$

using Montgomery multiplication to effect the modular multiplication entails precalculating the constant ($r^2 \bmod n$), for example as described in patent application EP 0 704 794.

In other cases, on the other hand, these additional calculations are largely compensated by the benefits linked to the use of Montgomery arithmetic. For example, since:

$$a^e \bmod n = (a*r^2 \bmod n)^{*e}*1 \bmod n,$$

the result of Montgomery exponentiation is transformed into the result of modular exponentiation by Montgomery multiplication by 1 of the result of the Montgomery exponentiation.

Clearly such additional operations generally represent a penalty, whether in terms of the calculation time or of the memory space necessary for storing the necessary constant ($r^2 \bmod n$), for example.

Because of this, it has recently been proposed to use modified cryptographic protocols that can use only Montgomery operations, for example in the patent application WO 2004/054168. Thus all the data uses the Montgomery representation and no conversion is necessary.

The patent application EP 0 578 059 also uses a solution of this type, in which modification of the relationship between public and private keys (i.e. modification of the protocol) seeks to circumvent constants that appear in the Montgomery operations and necessitate conversion of the processed data.

These solutions cannot be generalized, however, since they entail all actors of the system using Montgomery arithmetic and are therefore incompatible with systems used afterwards that employ Euclidean arithmetic.

In the above context; and in particular to reduce requirements in terms of calculation time and memory space, without compromising compatibility with existing systems, however, the invention proposes a method of storing cryptographic key data in a non-volatile storage unit of an electronic entity, characterized in that it comprises the following steps:

conversion of a data item, derived from at least one key portion and intended to be used with an operand in an operation of a first type into a key data item adapted to be used with said operand in an operation of a second type;

storage of the key data item in the non-volatile storage unit.

Thus in subsequent operation the key data can be read directly in the non-volatile storage unit in order to use it in the operation concerned of the second type, without necessitating the conversion operation that has already been effected.

In one embodiment, the conversion step is executed by a device external to the electronic entity and the key data item is transmitted from the external device to the electronic entity before the storage step.

For example, the storage step is executed during a step of personalization of the electronic entity.

In one embodiment that is particularly practical during subsequent operation, the conversion step includes Montgomery multiplication of the data item derived from the key portion by the square of the Montgomery radical.

In the same line of thinking, the invention also proposes a method of processing data used in an electronic entity including a non-volatile storage unit and necessitating the determination of the result of an operation of a first type involving an operand characterized in that it comprises the steps of:

reading of a key data item in the non-volatile storage unit;

execution of an operation of a second type using the key data item and said operand.

Thus the operation of the second type can be executed instead of the operation of the first type, without necessitating conversion of the data used in those operations.

In other words, the invention proposes a system using a method of processing data to determine the result of an operation of a first type involving an operand in an electronic entity including a non-volatile storage unit, characterized in that it comprises the steps of:

conversion of a data item, derived from at least one key portion and intended to be used with the operand in the operation of the first type into a key data item adapted to be used with said operand in an operation of a second type;

storage of the key data item in the non-volatile storage unit;

reading of the key data item in the non-volatile storage unit;

execution of the operation of the second type using the key data item and said operand.

In certain embodiments, the result of said operation of the second type is equal to the result of the operation of the first type. The required result is therefore obtained directly.

In one particular embodiment, the operation of the second type is a Montgomery multiplication and the operation of the first type is a Euclidean multiplication involving the operand and a key, said key data item being equal to the Montgomery product of the key and the square of the Montgomery radical.

There is thus obtained a solution that is particularly easy to use to determine the result of a Euclidean multiplication by means of a Montgomery multiplication, without necessitating an additional operation of converting the operands of the multiplication.

Other embodiments of the method include a step of deconversion of the result of the operation of the second type in order to obtain the result of the operation of the first type. The invention can be therefore applied to a wider range of operations.

In certain applications, the method includes the following steps:

drawing of a pseudo-random number;

deconversion of the pseudo-random number to obtain said operand.

This is a simple way to obtain a pseudo-random number in converted and non-converted form that can be used for subsequent calculations.

For example, the method includes a step of Montgomery multiplication of the pseudo-random number and the operand, which is a simple way to obtain the Euclidean square of a pseudo-random number.

At least one of the deconversion steps mentioned above can in practice be effected by a Montgomery multiplication by unity. Such an operation does not necessitate a knowledge of the Montgomery radix or its square.

Such a method can be used in a signature generation method or a signature verification method.

In a first situation that may be envisaged, the operation of the first type is a Euclidean multiplication and the operation of the second type is a Montgomery multiplication.

In a second situation that may be envisaged, the operation of the first type is a Euclidean modular exponentiation an the operation of the second type is a Montgomery exponentiation.

In the case of using the invention in the context of an algorithm employing elliptical curves, the key data may comprise the parameters of an elliptical curve and/or the coordinates of a base point of an elliptical curve. This data therefore does not have to be converted before it is used in an operation of the second type, for example a Montgomery operation.

As will emerge hereinafter, the invention is well suited to the situation where the electronic entity is a microcircuit card, although other electronic entities may be envisaged, of course.

The invention further proposes a device for storage of a cryptographic key data item in a non-volatile storage unit of an electronic entity, characterized in that it comprises:

means for conversion of a data item, derived from at least one key portion and intended to be used with an operand in an operation of a first type into a key data item adapted to be used with said operand in an operation of a second type;

means for storage of the key data item in the non-volatile storage unit.

In one possible embodiment, the conversion means are in a device external to the electronic entity and the means for storing the key data item comprise means for transmission of the key data item from the external device to the electronic entity for storage.

Such a device forms part of a card personalization device, for example.

The invention further proposes a device for processing of data in an electronic entity including a non-volatile storage unit and necessitating the determination of the result of an operation of a first type involving an operand characterized in that it comprises:

means for reading a key data item in the non-volatile storage unit;

means for executing an operation of a second type using the key data item and said operand.

Considered in the form of a system, the invention proposes a data processing device for determining the result of an operation of a first type involving an operand in an electronic entity including a non-volatile storage unit, characterized in that it comprises:

means for conversion of a data item, derived from at least one key portion and intended to be used with the operand in the operation of the first type into a key data item adapted to be used with said operand in an operation of a second type;

means for storage of the key data item in the non-volatile storage unit;

means for reading of a key data item in the non-volatile storage unit;

means for executing the operation of the second type using the key data item and said operand.

The devices proposed by the invention can have features corresponding to the optional features of the method referred to hereinabove and thus benefit from the resulting advantages.

Other features and advantages of the present invention will become apparent on reading the following description, which is given with reference to the appended drawings, in which.

Figure 1:
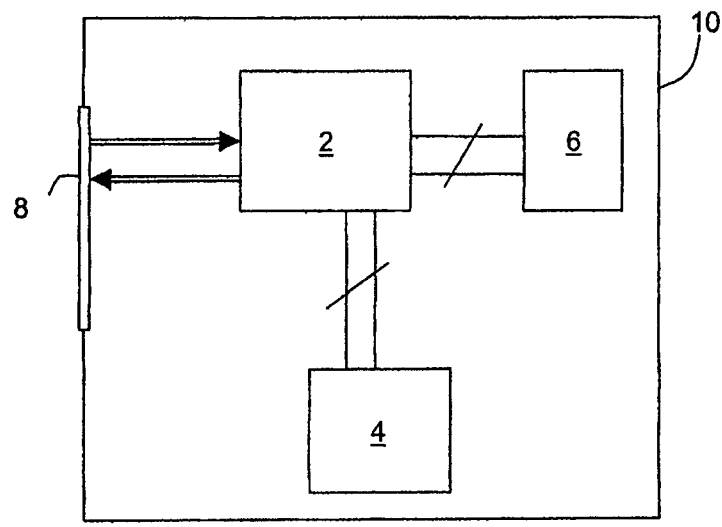
FIG. 1 represents diagrammatically the main elements of one possible embodiment of a microcircuit card.

One example of an electronic entity is a microcircuit card 10 the main electronic elements whereof are represented in FIG. 1 and which includes a microprocessor 2 connected on the one hand to a random-access memory (RAM) 4 and on the other hand to a non-volatile rewritable semiconductor memory 6, for example an EEPROM (Electrically Erasable Programmable Read Only Memory). Alternatively, the non-volatile rewritable semiconductor memory 6 could be a flash memory.

The memories 4, 6 are each connected to the microprocessor 2 by a bus in FIG. 1; alternatively, there could be a common bus.

The microcircuit card 10 also includes an interface 8 for communicating with a user terminal, here taking the form of contacts one of which provides a bidirectional link with the microprocessor 2, for example. The interface 8 therefore enables bidirectional communication to be set up between the microprocessor 2 and the user terminal into which the microcircuit card 10 is inserted.

Accordingly on insertion of the microcircuit 10 into a user terminal, the microprocessor 2 executes an operating system of the microcircuit card 10 in accordance with a set of instructions stored in a read-only memory (ROM), for example—not shown—or in the rewritable memory 6, which defines a computer program. This method generally includes the exchange of data with this terminal via the interface 8 and the processing of data within the microcircuit card 10, more precisely within the microprocessor 2, possibly using data stored in the rewritable memory 6 and data stored temporarily in the random-access memory 4.

Examples of methods that implement the invention are given hereinafter.

Figure 2:
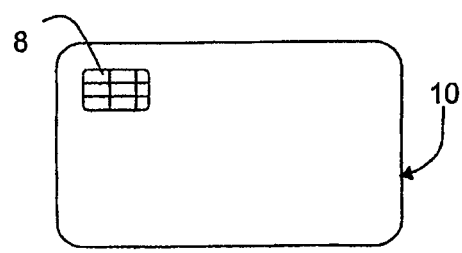
FIG. 2 shows the general physical appearance of the microcircuit card from FIG. 1.

FIG. 2 represents the general physical appearance of the microcircuit card 10 whose general shape is a very thin rectangular parallelepiped.

The communication interface 8 provided with the contacts already mentioned is clearly apparent on the face of the microcircuit card 10 visible in FIG. 2, in the form of a rectangle on the upper face of the microcircuit card 10.

Figure 3:
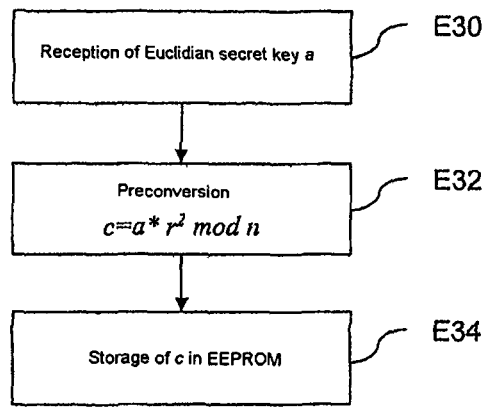
FIG. 3 represents a data storage method used in a first embodiment of the invention.
Figure 4:
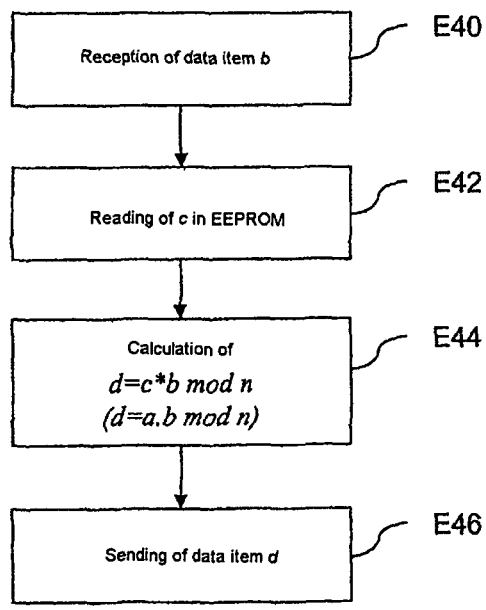
FIG. 4 represents a processing method according to the first embodiment of the invention.

Methods used in a first embodiment of the invention are represented in FIGS. 3 and 4.

The method represented in FIG. 3 is a method of storing a data item c in the non-volatile memory 6 that is used, for example, during the step of personalization of the microcircuit card, i.e. during the step in which all of the basic data that the non-volatile memory 6 must contain is stored in the microcircuit card.

This step is executed by a card personalization system, for example, operating in accordance with the same principles as a microcomputer, and using a special procedure to communicate to the microcircuit card 10 data to be stored in the non-volatile memory 6, generally via the interface 8.

During a step E30, the personalization system receives a secret key a, for example from a secure hardware module (SHM) such as an IBM 4758 PCMCIA. In the example described here, the secret key a is referred to as Euclidean because it is intended to be used in a cryptographic protocol defined by Euclidean operations.

There follows in the step E32 an operation of pre-conversion of the Euclidean secret key a into a key c usable directly in the Montgomery representation and obtained by means of the operation:

$$c = a * r^2 \bmod n,$$

in which r is the Montgomery radix for the chosen Montgomery representation.

As described in detail hereinafter, when the key c determined in this way is multiplied in the Montgomery sense by any operand, the result of the Montgomery multiplication is equal to the Euclidean product of the Euclidean secret key a and the operand itself.

The step E32 is executed by the card personalization system, for example. Such devices generally have large calculation and memory means so that the pre-conversion of the Euclidean secret key a is effected without difficulty.

The pre-converted key c can then be transmitted to the microcircuit card 10 for storage in the non-volatile memory 6 in a step E34.

Alternatively, and in particular if the microcircuit card 10 includes Montgomery arithmetic calculation electronic circuits, the pre-conversion step E32 can be carried out within the microcircuit card 10.

In a first form of this variant, the personalization system transmits the Euclidean secret key a and the Montgomery radix r via the interface 8 to the microprocessor 2, which stores these values in the random-access memory 4 and then effects the pre-conversion in order to obtain the pre-converted key c (step E32) and store it in the non-volatile memory 6 (step E34).

In a second form of this variant, the Montgomery radix r is stored in the non-volatile memory 6 during a step of personalization of the card as described above; during a later step in which a secret key is to be stored in the card, the Euclidean secret key a is transmitted to the card via the interface 8 and stored in the random-access memory 4, the Montgomery radix r is read in the non-volatile memory 6 and stored in the random-access memory 4, and the card then proceeds to calculate the pre-converted key c using the Montgomery multiplication operation referred to above (step E32) and stores the pre-converted key c in the area of the non-volatile memory 6 that until this point contained the Montgomery radix r (i.e. it overwrites the latter value).

This latter solution is of course usable only if it can be determined in advance (for example in the light of the intended uses of the card) that future operations will no longer use the Montgomery radix r.

An example of use of a microcircuit card prepared in accordance with the storage method that has just been described is described next with reference to FIG. 4.

In this example, a third party seeks to verify that his interlocutor is holding the secret key of value a in Euclidean representation (i.e. in practice that he is already in possession of the microcircuit card storing the Euclidean secret key a), although without communicating that secret key.

In accordance with a procedure that is relatively simple and is described here by way of one example of the use of the invention, the third party sends a data item b unknown to the cardholder (for example generated pseudo-randomly) and waits to receive in return the modular (Euclidean) product of the data item b sent and the secret key a, which product only a person holding the secret key is a priori able to determine.

The microcircuit card 10 then receives in a step E40 the data item b sent by the third part and stores it in the random-access memory 4.

In the next step E42, the microprocessor 2 commands reading of the pre-converted key c in the non-volatile memory 6. (Remember that this key c was stored in the non-volatile memory 6 in the step E34 described with reference to FIG. 3).

There follows in the step E44 the Montgomery multiplication of the pre-converted key c read in the non-volatile memory 6 and the data item b received from the third party, in order to obtain a result d. This calculation is carried out by a Montgomery arithmetic calculation electronic circuit (not shown), for example.

Because $c = a * r^2 \bmod n$ (by definition: see the step E32 described with reference to FIG. 3), the result of the Montgomery multiplication of the pre-converted key c and the received data item b is equal to the result of the modular Euclidean product of the Euclidean secret key a and the received data item b, in accordance with the formulae:

$$c*b \bmod n = (a*r^2 \bmod n)*b \bmod n = a \cdot b \bmod n.$$

The result of the modular multiplication by the Euclidean secret key a is obtained in this way, using Montgomery arithmetic, but without necessitating storage of its radix r, which avoids any change of protocol with the third party.

The data item d can therefore be sent directly to the third party in a step E46.

Note also in this connection that the Euclidean representation a and the pre-converted representation (or Montgomery representation) c are two forms of representation for the same secret key, since the holder of the microcircuit card can prove his knowledge of the secret key known in its Euclidean form to the third party a whereas only the key in its pre-converted form c is stored in the non-volatile memory 6.

Note however that the proposed solution entails the Montgomery arithmetic used at the time of pre-conversion (step E32) and that used for the Montgomery multiplication in the step E44 use the same radix r.

A second example of the use of the invention is described next with reference to FIGS. 5 and 6.

Figure 5:
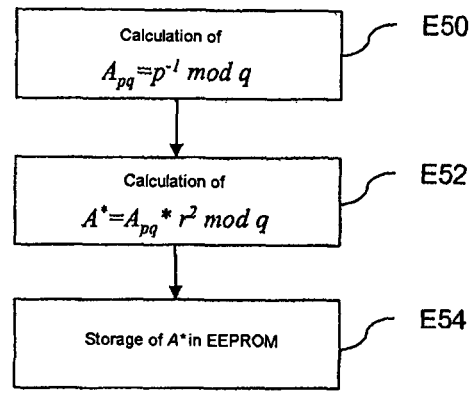
FIG. 5 represents a data storage method used in a second embodiment of the invention.
Figure 6:
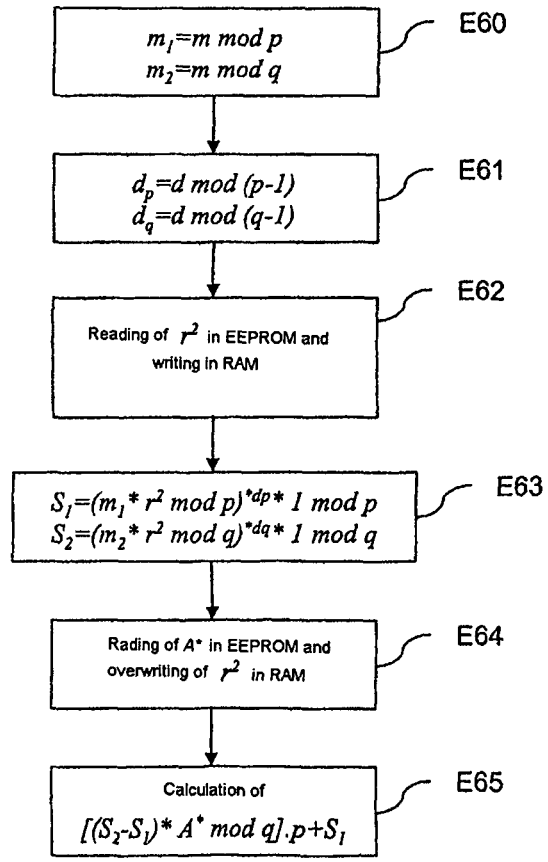
FIG. 6 represents a processing method according to the second embodiment of the invention.

FIG. 5 shows the main steps of a method for storing a data item derived from a key for its subsequent use in an RSA (Rivest-Shamir-Adelman) type encryption algorithm.

Remember that the RSA encryption system is based on the use of a public key formed of two integers (n, e) and a private key consisting of three integers (d, p, q), such that:

$$n = p \cdot q \text{ and } d \cdot e = 1 \bmod [(p-1)(q-1)]$$

where p and q are prime numbers.

In this encryption system, applying the private key to a message m consists in calculating the modular exponentiation product $m^d \bmod n$ (where $n = p \cdot q$), whether to sign the message m or to decrypt it.

To simplify the calculation of this modular exponentiation if the holder of the private key knows the decomposition $n = p \cdot q$, the Chinese remainder theorem (CRT) is frequently used, in accordance with the formula:

$$m^d = [(S_2 - S_1) \cdot A_{pq} \bmod q] \cdot p + S_1$$

where $S_1$ and $S_2$ are the results of partial modular exponentiations described in detail hereinafter and $A_{pq}$ is the modular reciprocal of p modulo q (i.e. where $A_{pq} = p^{-1} \bmod q$). Thus $A_{pq}$ is derived from the portion of the private key formed by the numbers p and q.

During a step preceding the execution of the modular exponentiation calculation, for example during personalization of the microcircuit card used (i.e. during the storage of the information necessary for the basic operation of the card), the method shown in FIG. 5 is executed.

That method begins in the step E50 with the calculation of the parameter $A_{pq}$ that has just been defined.

There follows the step E52 in which the pre-converted modular reciprocal A* is calculated using the formula:

$$A^* = A_{pq} * r^2 \bmod q.$$

The calculations effected in the steps E50 and E52 are effected by the card personalization system, for example, which then transmits the result, namely the pre-converted modular reciprocal A*, to the microcircuit card by means of the interface 8.

The microcircuit card then proceeds to store the pre-converted modular reciprocal A* in its non-volatile memory 6.

There is described next one possible solution for application of the private key according to the RSA algorithm in the microcircuit prepared by the method just described with reference to FIG. 5.

The proposed method uses the Chinese remainder theorem and therefore necessitates, in a step E60, calculation of the modular remainders of the message m to which the private key is applied, in accordance with the formulas:

$$m_1 = m \bmod p \text{ and } m_e = m \bmod q.$$

Similarly, in a step E61, the exponents used in the Chinese remainder theorem must be determined:

$$d_p = d \bmod (p-1) \text{ and } d_q = d \bmod (q-1).$$

The value of the parameter $r^2$, where r is the Montgomery radix, is then read in the non-volatile memory 6 in a step E62. This parameter is then stored in the random access memory (RAM) 4.

There can then follow in a step E63 the partial modular exponentiations using Montgomery arithmetic in accordance with the formulae:

$$S_1 = (m_1 * r^2 \bmod p)^{*d_p} * 1 \bmod p$$

$$S_2 = (m_2 * r^2 \bmod q)^{d_q*} * 1 \bmod q$$

The values obtained are naturally stored in the random access memory 4. After this step E63, the random access memory therefore contains the values of p, q, $S_1$, $S_2$ and $r^2$.

The proposed method no longer uses the value of the parameter $r^2$ once the results of the step E63 are known (see below).

It is therefore possible in a step E64 to read the pre-converted modular reciprocal A* in the non-volatile memory 6 and to store that value in place of the parameter $r^2$ in the random access memory, i.e. to overwrite the value of $r^2$.

It is therefore possible to limit the memory size necessary for execution of the method (which is particularly advantageous in a microcircuit card which typically has 4 kbytes or 8 kbytes of RAM, while storing the parameter $r^2$ alone necessitates 1024 bits, i.e. ⅛ kbytes). In this regard, note generally that the random access memory size necessary for executing a calculation is critical because it is necessary to minimize relatively costly access to non-volatile memory such as EEPROM.

The following calculation is then executed in a step E65, using a Montgomery multiplication:

$$[(S_2 - S_1) * A^* \bmod q] \cdot p + S_1,$$

which, given the definition of the pre-converted modular reciprocal specified in the step E52, has the precise value:

$$m^d = [(S_2 - S_1) \cdot A_{pq} \bmod q] p + S_1.$$

The result of the modular exponentiation is therefore obtained using Montgomery arithmetic but without having to store the parameter $r^2$ permanently in random access memory or to read this parameter in non-volatile memory on each execution of a Montgomery operation.

Moreover, although the microcircuit card stores a parameter used as one of the operands in a Montgomery multiplication (here the pre-converted modular reciprocal A*), the message m, the intermediate results (in particular $S_1$ and $S_2$), and the result $m^d$ are linked by the standard relationships of Euclidean representation, and the method that has just been described can therefore be used in a system in which the other users (for example those wishing to verify the signature produced by application of the private key or to encrypt the message sent to the holder of the private key) do not have access to Montgomery arithmetic.

A third example of the use of the invention is described next in the context of the Feige-Fiat-Shamir (FFS) signature scheme. The general principles of this signature scheme are explained in "Handbook of applied cryptography", A.

Menezes, P. Van Oorschot and S. Vanstone, CRC Press, 1996, section 11.4.1, for example.

According to this scheme, the private key is made up of k elements $s_1, s_2, \ldots, s_k$ linked to the k elements $v_1, v_2, \ldots, v_k$ that with the modulus n form the public key by the relationship: $v_j = s_j^{-2}$ mod n, for all j in 1 and k.

To sign a message m in the context of this signature scheme, a microcircuit card of the type described with reference to FIG. 1 is used, which stores the pre-converted keys $S^*_j$ defined on the basis of the keys $s_j$ of the chosen signature scheme in accordance with the relationship:

$$S_{*j} = s_j * r^2 \bmod n.$$

A method similar to that described with reference to FIGS. 3 and 5 can be used to store the pre-converted keys $S_{*j}$, for example during personalization of the microcircuit card.

To sign a message m in accordance with the FFS algorithm using the private key consisting of the elements $s_j$ using this kind of microcircuit card, the following steps are executed:

choice of a number $\rho_1$, for example by drawing pseudo-random numbers (this number will be considered as the Montgomery representation of a pseudo-random number);

calculation of $\rho_0 = \rho_1 * 1$ mod n (which amounts as explained hereinafter to deconverting the number $\rho_1$ so that the number $\rho_0$ is considered as the Euclidean representation of the number represented by $\rho_1$ in the Montgomery representation);

calculation of $u = \rho_1 * \rho_0$ mod n (which implies that $u = \rho_0^2$ mod n in accordance with the standard FFS scheme);

calculation of the set of k elements $e = (e_1, e_2, \ldots, e_k) = h(m \| u)$ where h is a hashing function and where the components $e_i$ of e have the value 0 or 1;

calculation of $$s = \rho_0 * \left( \prod_{j=1}^{k} * S_{*j}^{*e_j} \right),$$

where the symbol $$\prod_{j=1}^{k} *$$

represents the product of the k elements by Montgomery multiplications.

Given the definition of $S_{*j}$, the number s is none other than the signature of the message m in the FFS scheme:

$$s = \rho_0 \cdot \prod_{j=1}^{k} s_j^{e_j}.$$

Note that Montgomery arithmetic has therefore been used to effect the modular multiplications required by the FFS scheme without having to store the Montgomery parameter r (or its square $r^2$) in the microcircuit card.

A fourth embodiment of the invention, described next, relates to the Guillou-Quisquater (GQ) signature scheme. The principles of this kind of signature scheme are described in the work "Handbook of applied cryptography" already referred to, for example, in section 11.4.2.

The GQ scheme uses a private key a and a public key consisting of the modulus n, an integer e and an identifier $J_A$ of the holder A of the private key a.

To obtain the signature of a message m, the holder A of the private key a stored in pre-converted form $a_m$ in the non-volatile memory of a microcircuit card (where $a_m = a * r^2$ mod n) uses the following method in the microcircuit card:

choice of a number k unknown to the public and preferably variable, for example by drawing of a pseudo-random number;

calculation by Montgomery exponentiation followed by deconversion of the number $\rho$: $\rho = k^{*e} * 1$ mod n;

calculation of $l = h(m \| \rho)$, where h is a hashing function;

calculation by means of a Montgomery multiplication using the pre-converted key $a_m$ of the signature s from the formula:

$$s = k * (a_m^{*l}) * 1 \bmod n.$$

The calculations are therefore effected using Montgomery arithmetic, but without necessitating storage of the Montgomery radix r (or its square), thanks to the use of the pre-converted key $a_m$ and to the organization of the calculations in such a manner as to use only deconversions (i.e. Montgomery multiplications by unity) that do not need to know the Montgomery radix.

The signature (s, l) obtained is therefore identical to that which would have been obtained by Euclidean calculations from the private key a and can therefore be verified by means of the public key (n, e, $J_A$) previously referred to and linked to the private key a by the standard relationships of Euclidean arithmetic described in the work mentioned above, for example, at the algorithm 11.47.

The algorithm for verification of the signature (s, l) can nevertheless also use the invention, for example in accordance with the following method that uses pre-converted keys in an electronic entity in which are stored the square $r^2$ of the Montgomery radix and the pre-converted identifier $J_{Am}$, which has the value $J_{Am} = J_A * r^2$ mod n:

reading of the square $r^2$ of the Montgomery radix in the non-volatile memory 6 and storing it in the random access memory 4;

conversion of the signature s in the Montgomery representation by the calculation of the converted signature $s_m = s * r^2$ mod n;

reading of the pre-converted key $J_{Am}$ in non-volatile memory and storing this pre-converted public key in random access memory, overwriting the value of the square $r^2$ of the Montgomery radix previously stored therein;

calculation of $u = s_m^{*e} * J_{Am}^{*l} * 1$ mod n;

calculation of $l' = h(m \| u)$, where h is the hashing function already referred to;

verification of the validity of the signature by verification of the equation $l = l'$.

In this latter embodiment, the square $r^2$ of the Montgomery radix is stored in the non-volatile memory of the electronic entity. However, storing the public key (identifier) $J_A$ in pre-converted form authorizes overwriting in random access memory of the square $r^2$ of the Montgomery radix and thus limitation of the memory size required to effect the operation.

A fifth embodiment of the invention is described next in the context of the DSA signature scheme as described in the work "Handbook of applied cryptography" already referred to.

The public key element a and the private key a are stored in their pre-converted forms $a_m$ and $a_m$, respectively, in the non-volatile memory of the electronic entity that has to generate the signature, for example a microcircuit card. Thus $a_m=a*r_1^2$ mod p where a is the public key used in the protocol concerned and $a_m=a*r_2^2$ mod q where a is the corresponding private key. (A Montgomery radix $r_1$ is used for the operations modulo p and a Montgomery radix $r_2$ is used for the operations modulo q.)

Signature generation can then be effected by means of the following steps:
  selection of a number $k_1$, for example by drawing of a pseudo-random number;
  calculation of $k_0=k_1*1$ mod q: $k_0$ will be considered to be a pseudo-random number whose representation converted into the Montgomery representation has the value $k_1$;
  calculation of $\rho=(a_m^{*k0}*1$ mod p)mod q;
  calculating the reciprocal of $k_1$ modulo q in the Montgomery sense, $k_1^{*(-1)}$mod q, by calculation of (by analogy with the Euclidean case): $k_1^{*(q-2)}$mod q;
  calculation of $s=(k_1^{*(-1)})*\{h(m)+a_m*\rho\}$ mod q, where h is a hashing function.

Note that $k_1^{*(-1)}$mod $q=k_0^{-1} \cdot r_2$ mod q, i.e. that $k_1^{*(-1)}$ is also the result of the conversion into the Montgomery representation of the reciprocal of $k_0$.

The signature of the message m in accordance with the DSA protocol using the private key a and the public key a is therefore the pair ($\rho$, s).

A sixth embodiment of the invention is described next in the context of the GQ2 signature protocol, described for example in the paper "GQ2 une preuve zero-knowledge de connaissance de la factorisation complément essentiel à RSA" ["GQ2 a zero-knowledge proof of knowledge of the complement factorization essential to RSA"], S. Boutiton, F. Daudé and L. Guillou, proceedings of the SSTIC04 symposium.

The electronic entity used by the prover, for example a microcircuit card, stores in its non-volatile memory m secret numbers $Q_1, Q_2, \ldots, Q_m$ in their pre-converted form for the Montgomery operations (which can therefore be referred to as their Montgomery form) $Q_1^*, Q_2^*, \ldots Q_m^*$, where $Q_i^*=Q_i \cdot r$ mod $n=Q_i*r^2$ mod n.

The electronic entity held by the prover then executes the following steps:
  selection of a number $\rho_1$, for example by drawing of a pseudo-random number;
  deconversion of the number $\rho_1$ considered in Montgomery form to obtain a number $\rho_0$ which can then also be considered to have been obtained by drawing of a pseudo-random number, in accordance with the formula $\rho_0=\rho_1*1$ mod n;
  calculation of the witness $W=(\rho_1^{*v}$ mod n)*1 mod n, where the verification exponent v is a given of the protocol, W then having the value $\rho_0^v$ mod n;
  in response to each challenge from the verifier consisting in a series of m random numbers $d_1, d_2, \ldots, d_m$, calculation of the response $$D=\rho_0*(Q_1^*)^{*d_1}*(Q_2^*)^{*d_2}* \ldots * (Q_m^*)^{*d_m}.$$

Thanks to the definition of the pre-converted secret numbers $Q_i^*$, the number D has the value $\rho_0 \cdot Q_1^{d_1} \cdot Q_2^{d_2} \ldots Q_m^{d_m}$: this is the response to be sent to the verifier without necessitating other complementary calculations.

As before, storage of the pre-converted secret keys and deconversion of the pseudo-random number $\rho_1$ enable Montgomery operations to be applied to data received from an external device and to be sent to that external device, without the latter necessarily having access to Montgomery arithmetic, or the electronic entity that uses Montgomery arithmetic using the known Montgomery radix r (or its square $r^2$).

The embodiments that have just been described are merely possible examples of implementation of the invention. The invention could be applied to protocols other than those indicated.

For example, noting that there is an isomorphism between an elliptical curve $$EC: y^2=x^3+a \cdot x+b \text{ mod } p$$

and the associated Montgomery curve $$EC^*: y^{*2}=x^{*3}+(a^*r^2)^*x+(b^*r^2)\text{mod } p,$$

and consequently that if a point P with coordinates (x, y) is on the curve EC, its image as a result of this isomorphism is the point on the curve EC* with coordinates ($x^*r^2$, $y^*r^2$), the invention can be used in the context of algorithms operating on elliptical curves that store in the electronic entity the preconverted parameters ($a^*r^2$), ($b^*r^2$) and the preconverted coordinates ($x^*r^2$, $y^*r^2$) of the base point, substituting Montgomery multiplications for the Euclidean multiplications.

Operations on the points of the elliptical curve used in the cryptographic algorithms amount to multiplications, which can therefore be effected using Montgomery arithmetic.

Moreover, when these operations use the coordinates of the base point and the latter are stored in preconverted form in the electronic entity, Montgomery arithmetic can be used directly without having to store the value of the Montgomery radix r or its square $r^2$.

As in the aforementioned examples, it can nevertheless be necessary to deconvert the result obtained by applying to it a Montgomery multiplication by unity, which does not involve knowing the Montgomery radix.

The invention is not limited to use in microcircuit cards and is to be contrary applicable to any type of electronic entity, for example computers, personal digital assistants (PDA), telephones and electronic passports (these examples are not limiting on the invention).

The invention claimed is:

1. A method of processing data used in an electronic entity including a non-volatile storage unit, comprising the steps of:
  interfacing, via an interface of the electronic entity, with a terminal for two-way communications with a processor of the electronic entity;
  generating, at the terminal a pseudo-random number;
  transmitting, via the terminal, the pseudo-random number (b) to a keyholder in communication with the terminal;
  receiving, at the terminal, a first result (b') of an operation of a first type between the pseudo-random number (b) and a secret key (a) from the keyholder;
  transmitting, via the interface, the pseudo-random number (b) to the processor of the electronic entity, whereupon the processor stores the pseudo-random number (b) in a memory of the electronic entity;
  retrieving, at the processor of the electronic entity, a key data item (c), derived from a conversion of the secret key (a) and an operand (r), from the non-volatile storage unit of the electronic entity;
  execution, at the processor of the electronic entity, of an operation of a second type using the key data item (c) and said pseudo-random number (b) received from the terminal to obtain a second result (b");

transmitting, via the interface of the electronic entity (10), the second result (b″); and comparing, via a processor of the terminal, the first result (b′) and the second result (b″), a match between the first and second results (b′, b″) indicating a match between the secret key (a) of the keyholder and the key data item (c) stored in the electronic entity.

2. The method according to claim 1, wherein the result of said operation of the second type is equal to the result of the operation of the first type.

3. The method according to claim 1, wherein the operation of the second type is a Montgomery multiplication and the operation of the first type is a Euclidean multiplication involving the pseudo-random number (b) and the secret key (a), said key data item (c) being equal to the Montgomery product of the secret key (a) and the square of a Montgomery radix.

4. The method according to claim 1, further comprising:
a step of deconversion of the result of the operation of the second type in order to obtain the result of the operation of the first type.

5. The method according to claim 4, wherein at least one deconversion step is executed by a Montgomery multiplication by unity.

6. A method for generation of signatures, wherein it uses a data processing method according to claim 1.

7. A method for verification of signatures, wherein it uses a data processing method according to claim 1.

8. A device for processing of data in an electronic entity including a non-volatile storage unit, comprising:

means for communicating with a keyholder, via which a pseudo-random number (b) is transmitted to the keyholder, and a first result (b′) of an operation of a first type between the pseudo-random number (b) and a secret key (a) from the keyholder is received from the keyholder;

means for interfacing with an interface of the electronic entity for two-way communications with a processor of the electronic entity, through which a pseudo-random number (b) is transmitted to the electronic entity, whereupon the processor stores the pseudo-random number (b) in a memory of the electronic entity;

means for causing a key data (c) item stored in the non-volatile storage unit of the electronic entity to be retrieved by the processor of the electronic entity;

means for causing an operation of a second type to take place on the processor of the electronic entity using the key data item and said pseudo-random number (b);

receiving means for receiving, via the interface of the electronic entity, the second result (b″); and means for comparing the first result (b′) and the second result (b″), a match between the first and second results (b′, b″) indicating a match between the secret key (a) of the keyholder and the key data item (c) stored in the electronic entity.

9. The device according to claim 8, wherein the result of said operation of the second type is equal to the result of the operation of the first type.

10. The device according to claim 8, wherein the operation of the second type is a Montgomery multiplication and the operation of the first type is a Euclidean multiplication involving the pseudo-random number (b) and the secret key (a), said key data item (c) being equal to the Montgomery product of the secret key (a) and the square of a Montgomery radix.

11. The device according to claim 8, further comprising:
means for deconversion of the result of the operation of the second type adapted to obtain the result of the operation of the first type.

12. The device according to claim 11, wherein the deconversion means comprise means for Montgomery multiplication by unity.

13. A device for generation of signatures, wherein it comprises a data processing device according to claim 8.

14. A device for verification of signatures, wherein it comprises a data processing device according to claim 8.

* * * * *